(12) United States Patent
Takano et al.

(10) Patent No.: US 10,962,732 B2
(45) Date of Patent: Mar. 30, 2021

(54) FLEXIBLE BOOT WITH REPLACABLE REPOSITIONING DEVICE THEREIN

(71) Applicant: Senko Advanced Components Inc, Marlborough, MA (US)

(72) Inventors: Kazuyoshi Takano, Tokyo (JP); Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/388,150

(22) Filed: Apr. 18, 2019

(65) Prior Publication Data

US 2019/0339475 A1    Nov. 7, 2019

Related U.S. Application Data

(60) Provisional application No. 62/666,392, filed on May 3, 2018.

(51) Int. Cl.
| | | |
|---|---|---|
| *G02B 6/44* | (2006.01) | |
| *G02B 6/38* | (2006.01) | |
| *H01R 13/58* | (2006.01) | |

(52) U.S. Cl.
CPC ......... *G02B 6/4478* (2013.01); *G02B 6/3887* (2013.01); *H01R 13/58* (2013.01)

(58) Field of Classification Search
None
See application file for complete search history.

(56) References Cited

U.S. PATENT DOCUMENTS

| | | |
|---|---|---|
| 2003/0007744 A1 | 1/2003 | Ngo |
| 2004/0121646 A1 | 6/2004 | Iamartino et al. |
| 2009/0196555 A1 | 8/2009 | Lin et al. |
| 2013/0343706 A1* | 12/2013 | Droesbeke ........... G02B 6/4478 385/76 |

* cited by examiner

*Primary Examiner* — Jerry Rahll
(74) *Attorney, Agent, or Firm* — Edward S. Jarmolowicz, Esq.

(57) ABSTRACT

A boot assembly having a boot body with a passageway molded from a proximal to distal end of the body. The passageway accepts a repositioning device made of a malleable material such as metal that retains its shape under internal forces of the boot assembly. The boot assembly further comprises one or more cables for fiber optics or power. Bending the flexible boot assembly from a first position to a second position, the flexible boot assembly retains the second position without returning to the first position under the resilient material of the boot.

9 Claims, 13 Drawing Sheets

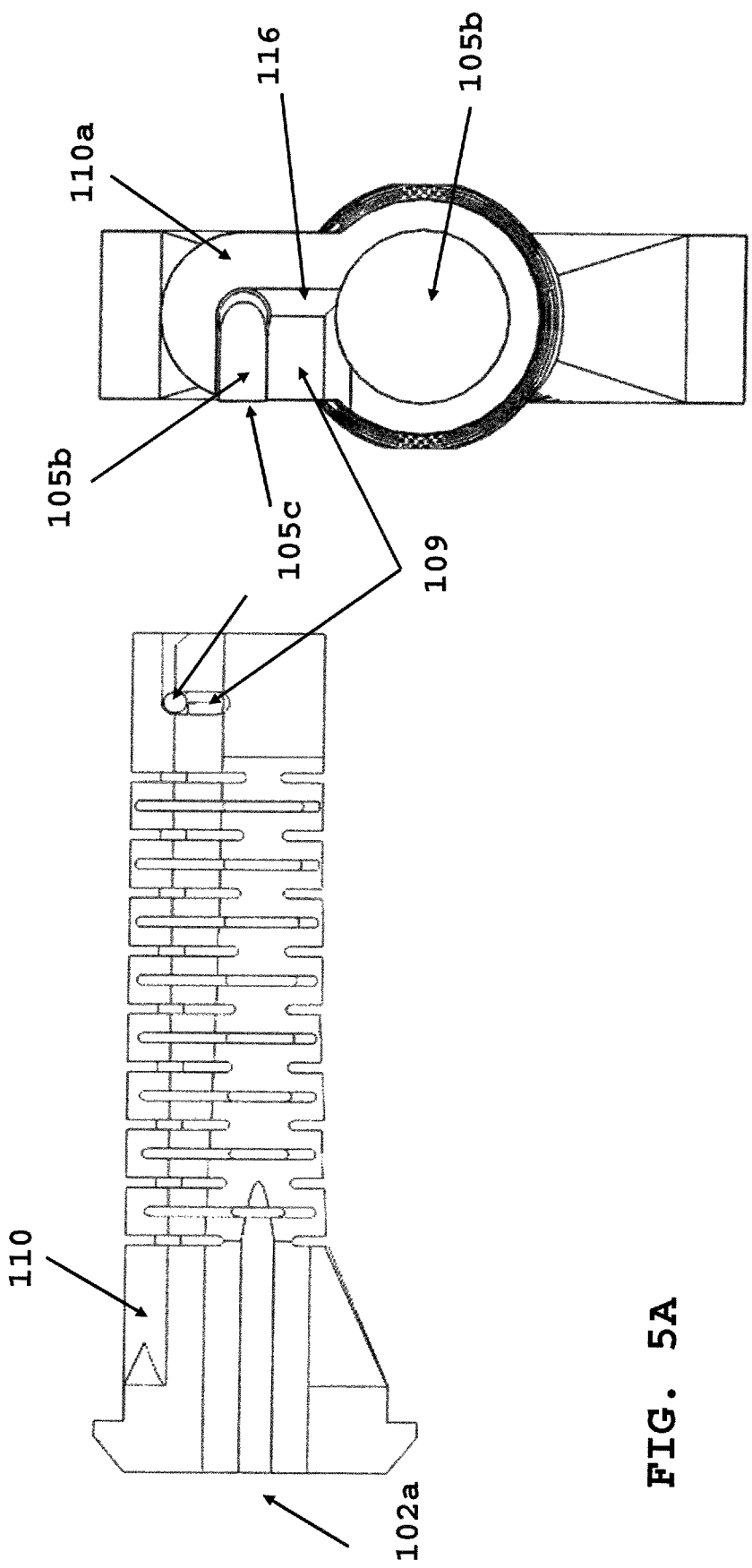

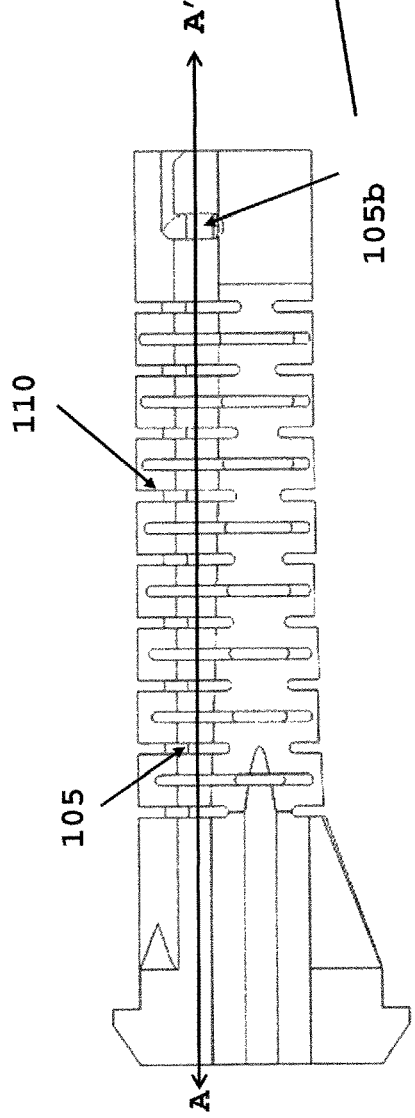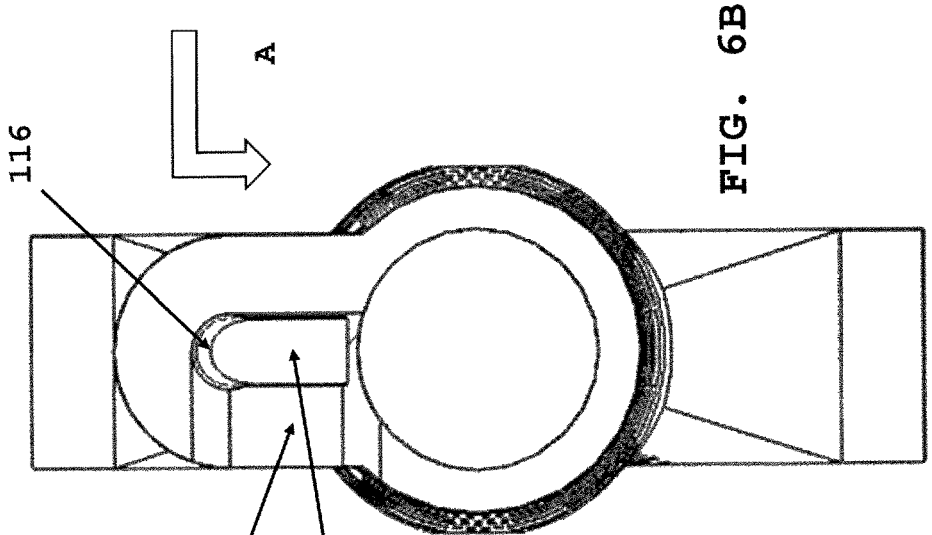
FIG. 6A
FIG. 6B

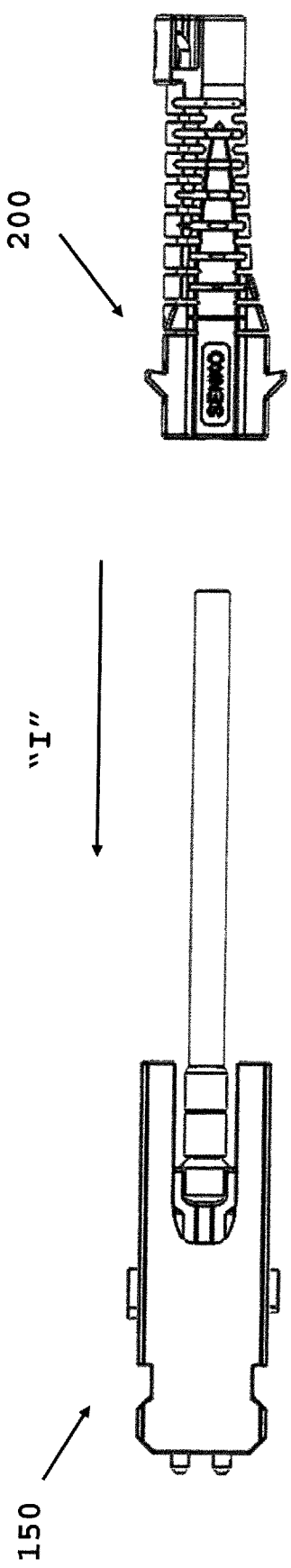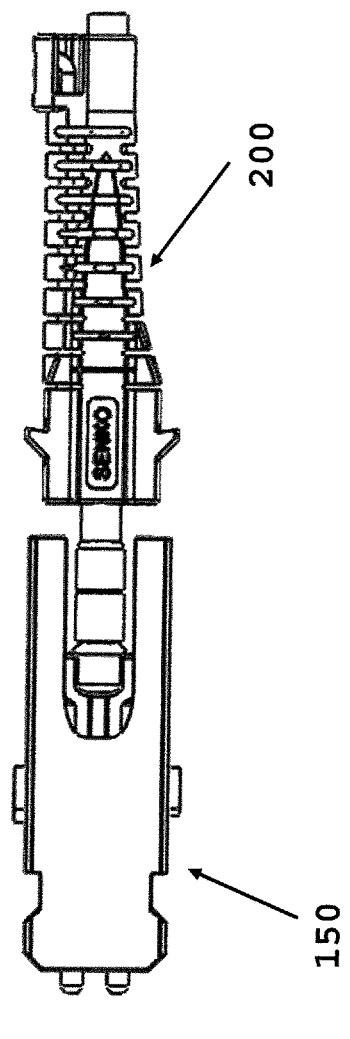
FIG. 11
FIG. 12

FLEXIBLE BOOT WITH REPLACABLE REPOSITIONING DEVICE THEREIN

CROSS REFERENCE TO RELATED APPLICATIONS

This application claims priority to U.S. Patent Application 62/666,392 filed May 3, 2018, which is incorporated herein by reference.

FIELD OF THE INVENTION

The present disclosure relates generally to fiber optic connectors specifically a boot assembly that contains fibers used to carry light representing information.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

The purpose of this invention is allow the operator or user to move and reposition a boot. This is important because the boot typically extends the length of a connector, and repeatably reposition the boot without breaking internal fibers reduces the overall space for a group of connectors. Also, a boot may be repositioned to access a portion of a connector that would be otherwise blocked by a conventional, rigid boot. Prior art boots tried to solve the access and space problem by making the boot shorter or reduce its diameter, but only so much reduction can be accomplished before the boot loses structural integrity that can lead to failure, such as fiber cable breaking.

BRIEF DESCRIPTION OF THE DRAWINGS

FIG. 5A is a perspective side view of the boot with the repositioning device inserted therein;

FIG. 5B is a perspective end view of the repositioning device inserted within the boot body prior to rotating into a securing recess;

FIG. 6A is a perspective side view of the boot with the repositioning device inserted in its final position;

FIG. 6B is a perspective end view of the repositioning device with its distal end rotated into a securing recess in direction of arrow "A";

FIG. 11 is an exploded view of a fiber optic connector prior to insertion of a flexible boot assembly;

FIG. 12 is a perspective view of the flexible boot assembly partially inserted at a distal end of the fiber optic connector of FIG. 11;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A boot, as used herein, refers to a device and/or components thereof that enclosed and protects fiber optic or electric cables that transmit information signals and/or power. The boot is molded as one piece and made of a flexible, waterproof material. The may be used on a connector, such as, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a replaceable or insertable repositioning device that allows a user to move and position a boot and the boot will stay in the new position. The repositioning will not damage the cabling.

Figure 1:
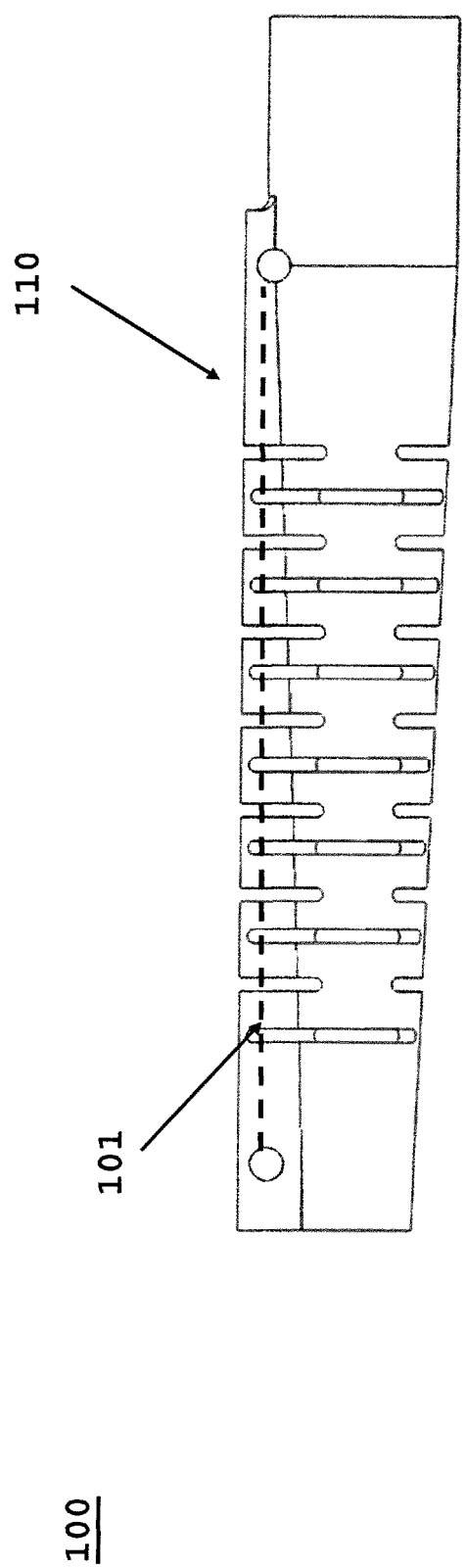
FIG. 1 is a perspective view of a prior art boot with an embedded repositioning device molded as part of the boot.

FIG. 1A shows a perspective view of a prior art boot with an unaccessible piece of wire and molded as one piece as disclosed in US2009/0196555A1 to Lin. Lin suffers from a molded one-piece device making manufacture difficult. Also, the Lin device does not allow for replacing its member to change boot stiffness to repositioning. This is important as cable may have multiple fibers or electrical wires that impart an opposing force resisting a new position. Another prior art reference is a two-piece that uses a clip-on portion like US2004/0121646A1 to Iamartino et al. The clip-on suffers from a number of drawbacks such as strength because it is a two-piece, and can fail after repeatable uses at the joint. Also, the two-piece results in a larger boot, which is contrary to the benefits of the present invention. Other prior art provides a guide or channel for a fiber cable as disclosed in US2003/0007744A1 to Ngo. Ngo does not disclose the feature to move a boot with a cable therein to a new position, and then reposition into another position. Ngo teaches the orientation is fixed. FIG. 1 depicts a boot assembly 100 with a boot that covers one or more cables that may be a fiber optic or electric conductor. The boot 110 contains an embedded flexible member 101 along a length of the boot. The member is to hold the boot in a new, changed position.

Figure 2:
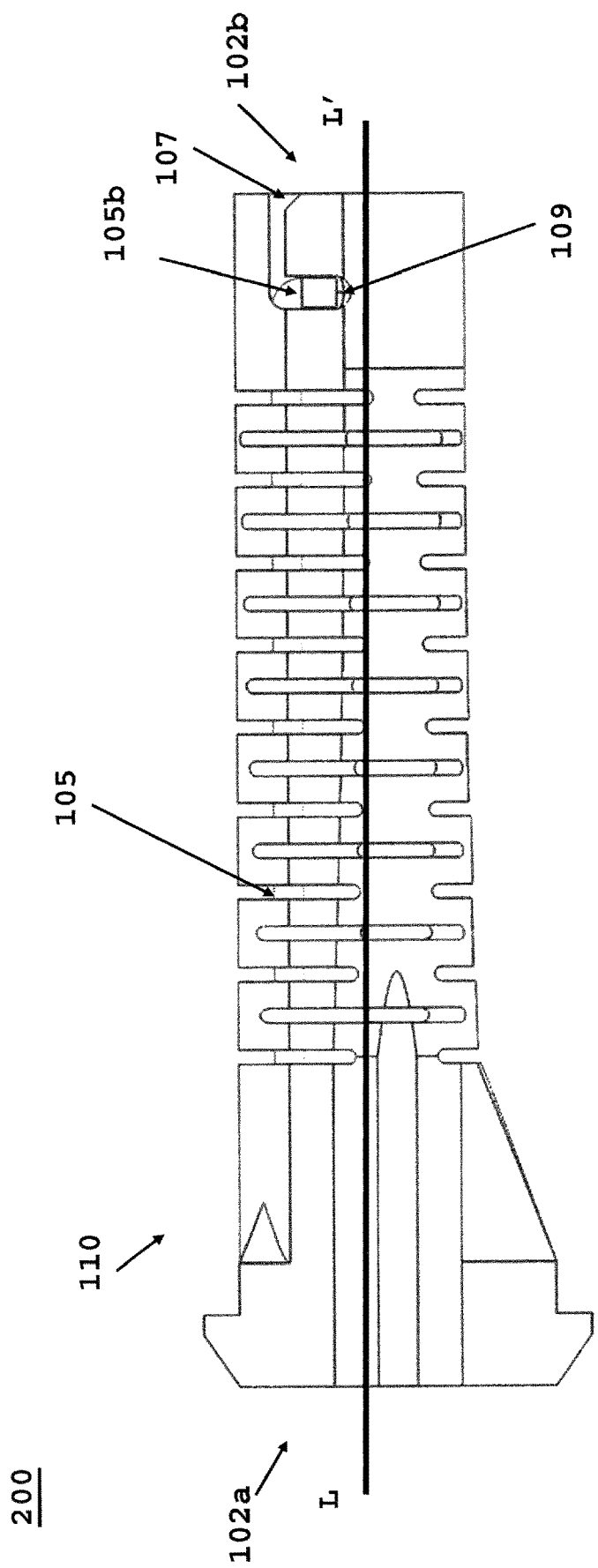
FIG. 2 is a perspective view of a boot with a with an embedded repositioning device according to an embodiment.

FIG. 2 depicts an embodiment of the present invention called a flexible boot assembly 200, with repositioning device 105 inserted along longitudinal axis L-L' from proximal end 102a to distal end 102b. Device 105 nearer the distal end has bend 105b that when rotated into recess 109 further secures replaceable device 105.

Figure 3:
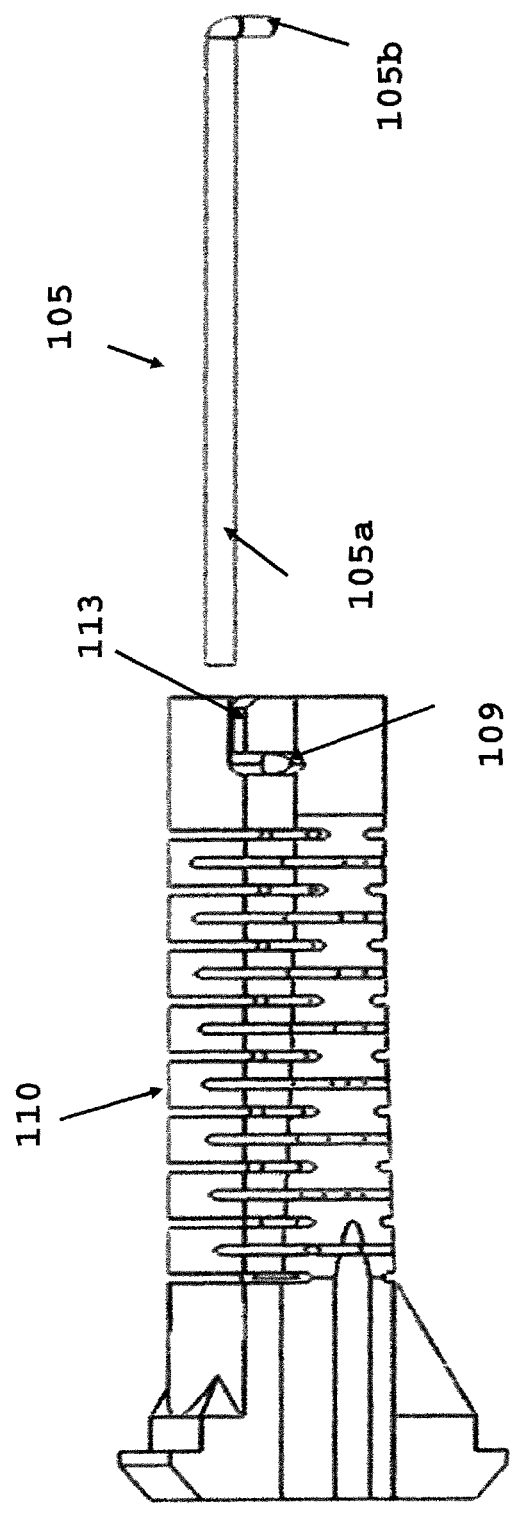
FIG. 3 is an exploded view of FIG. 2.
Figure 4:
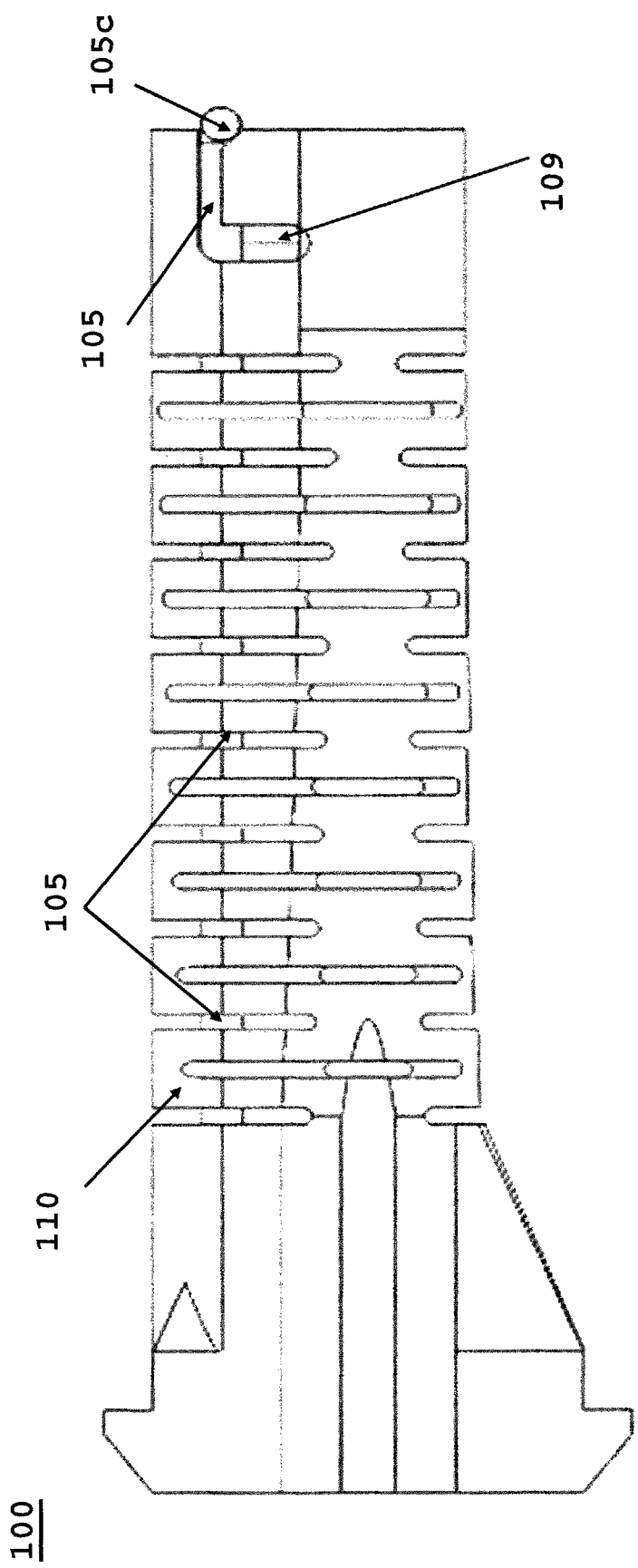
FIG. 4 is a perspective side view of the repositioning device partially inserted into a boot body.

FIG. 3 depicts the invention with an embodiment of repositioning device 105 (refer to FIG. 8B) removed from passageway 113 molded within boot 110. Device 105 has shaft 105a with bend 105b at one end. FIG. 4 depicts cable assembly 100 with boot 110 having repositioning device 105 embedded therein. Device 105 is partially inserted in the boot 110 and just prior to rotating bend 105b into recess 109 as shown by face of bend 105c. The repositioning device 105 or 106 (FIG. 8A) is made of a malleable yet strong material such as metal.

FIG. 5A depicts boot 110 with repositioning device fully inserted just prior to rotating bend 105b into recess 109 as shown by bend face 105c projecting outward. FIG. 5B depicts an end view of boot 110 showing boot wall 110a with bend 105b prior to rotating into recess 109. The device was inserted into passageway 116 at distal end 105b of boot. Cabling is positioned within the channel shown at distal end 105b.

Figure 7:
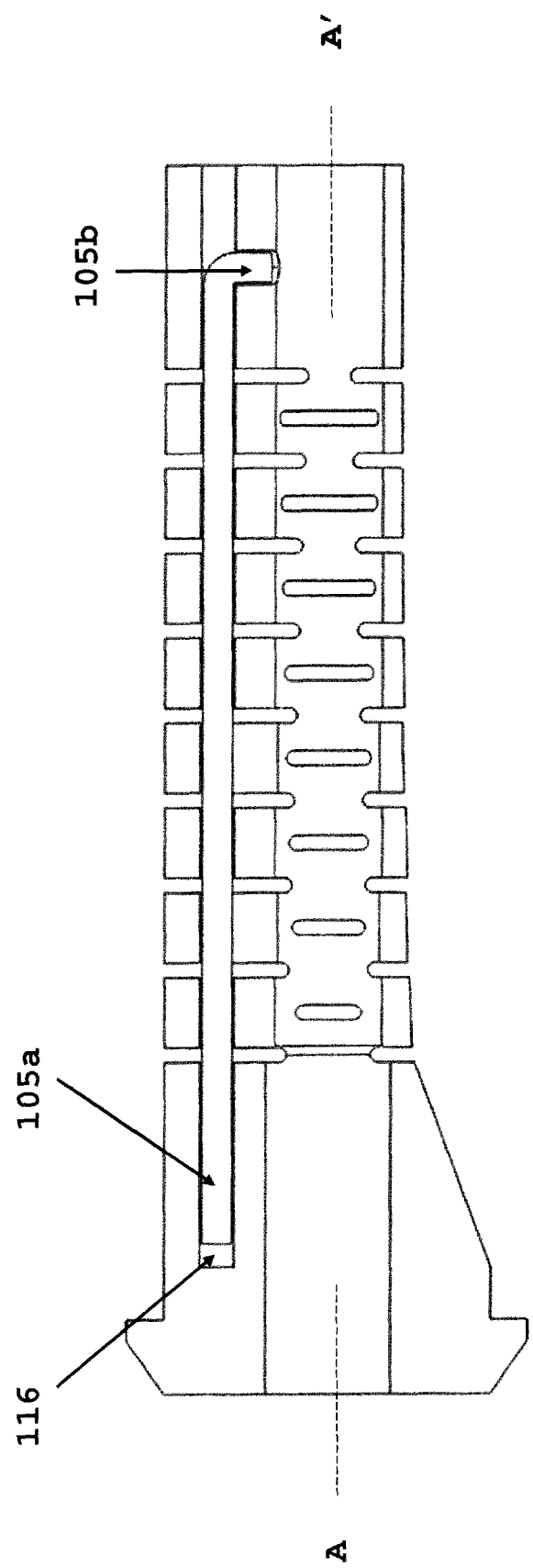
FIG. 7 is a cross-section view along A-A' of the boot with a fully inserted repositioning device therein.

FIG. 6A depicts repositioning device 105 fully inserted and secured in passageway of boot 110. Bend 105b is positioned within recess 109 to secure repositioning device. FIG. 6B depicts rotation in direction of arrow "A" for bend 105b to secure device within boot 110 in-line with passageway 116. FIG. 7 depicts a cross-section review along A-A' of FIG. 6A. Repositioning device 105 comprises shaft 105a that extends along A-A' with bend 105b to secure device within passageway 116 of boot. As shown in FIG. 7, the repositioning device is prevented from moving forward or rearward within passageway 116, as bend 105b prevents longitudinal movement within passageway.

Figure 8A:
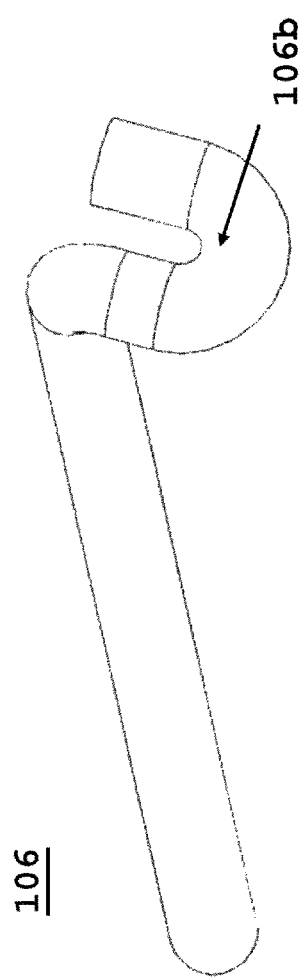
FIG. 8A is perspective view of a repositioning device according to another embodiment.
Figure 8B:
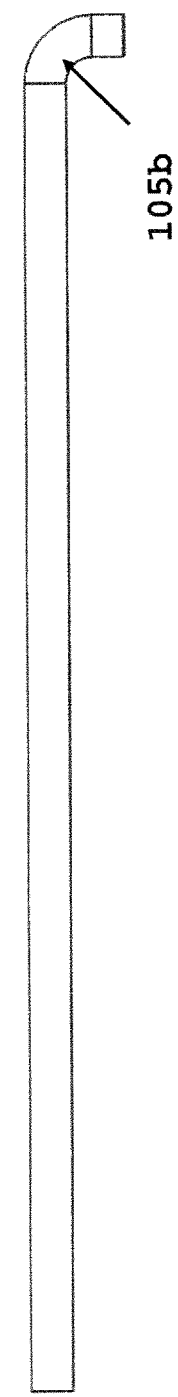
FIG. 8B is perspective view of a repositioning device according to the first embodiment of FIG. 2.

FIG. 8A depicts a second embodiment of repositioning device 106. The distal end has hook 106b configured to engage and secure device via corresponding recess 109 in boot 110 at distal end 102b. FIG. 8B is an embodiment of repositioning device 105 with bend 105b configured to engage and secure device via corresponding recess 109 in boot 110.

Figure 9:
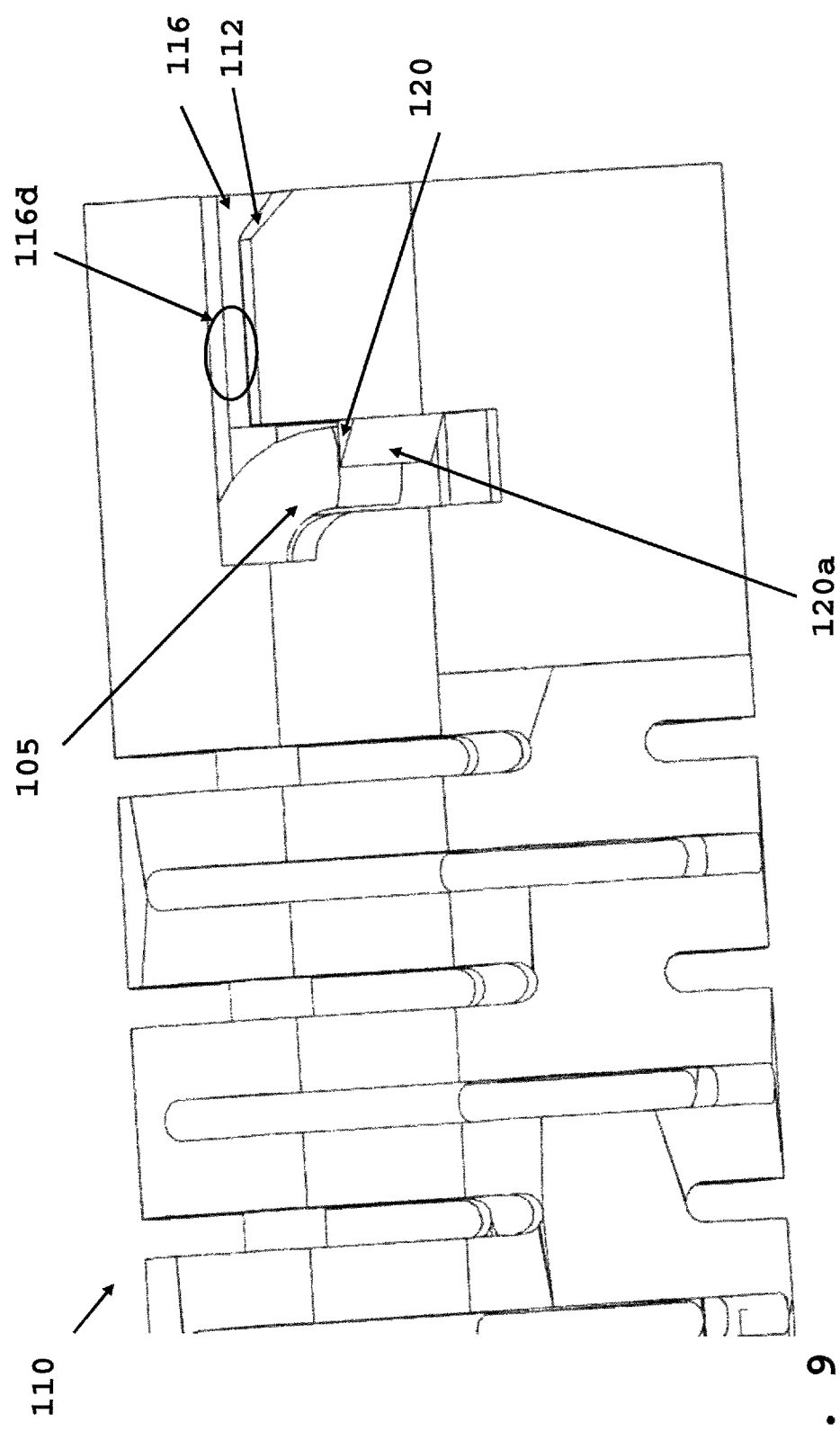
FIG. 9 is a zoomed view of a distal of the boot with repositioning device locked therein.
Figure 10:
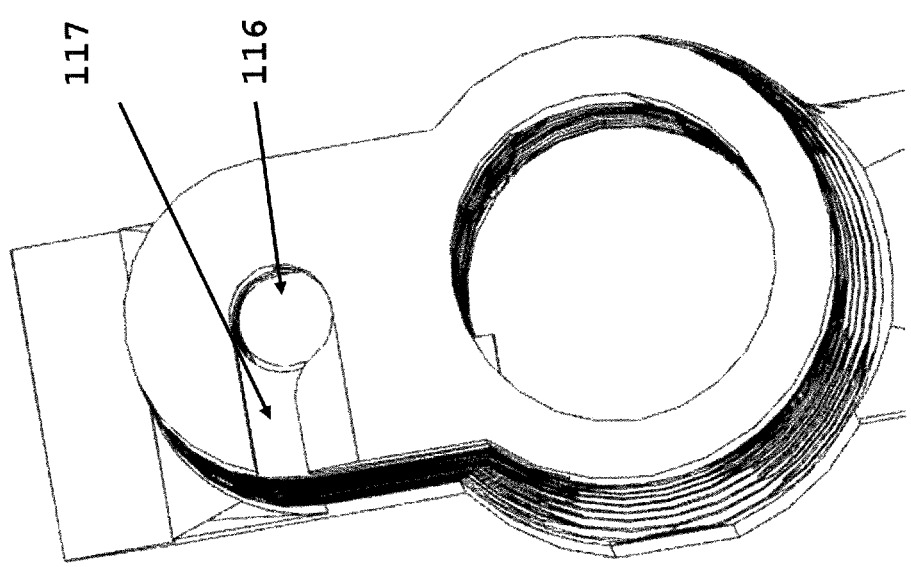
FIG. 10 is a distal end view of a boot without a repositioning device.

FIG. 9 depicts boot 110 with safety catch 120. Catch 120 is deformable, and bend 105b is rotated, as described in FIG. 6B, bend depress catch 120 along a chamfered edge as shown, and once bend 105b or hook 106b is beyond edge 120a, catch 120 restores to original positioning locking bend 105b behind catch 120. Catch 120 is made from a resilient, spring-like material such as plastic. FIG. 9 further comprises chamfered surface 112 at the entrance of passageway 116. Surface 112 guides a proximal end of repositioning device 105 or repositioning device 106 into passageway 116. Furthermore, passageway 116 with diameter 116d is substantially equal to an outer diameter of repositioning device (105, 106). The repositioning device is secured within the passageway under a frictional force exerted by the smaller passageway diameter. The boot made out of a flexible material will expand under the large diameter of the repositioning device and then contract around the repositioning device shaft further securing the repositioning device within the passageway of the flexible boot. As proximal end of device (105, 106) is inserted into passageway and is fully inserted, inner diameter 116a is restored as it was previously compressed by larger shaft 105a outer diameter. This further restraints device (105, 106) within boot 110. FIG. 10 depicts an end view of boot 110 illustrating passageway 116 and recess size 117.

Figure 13:
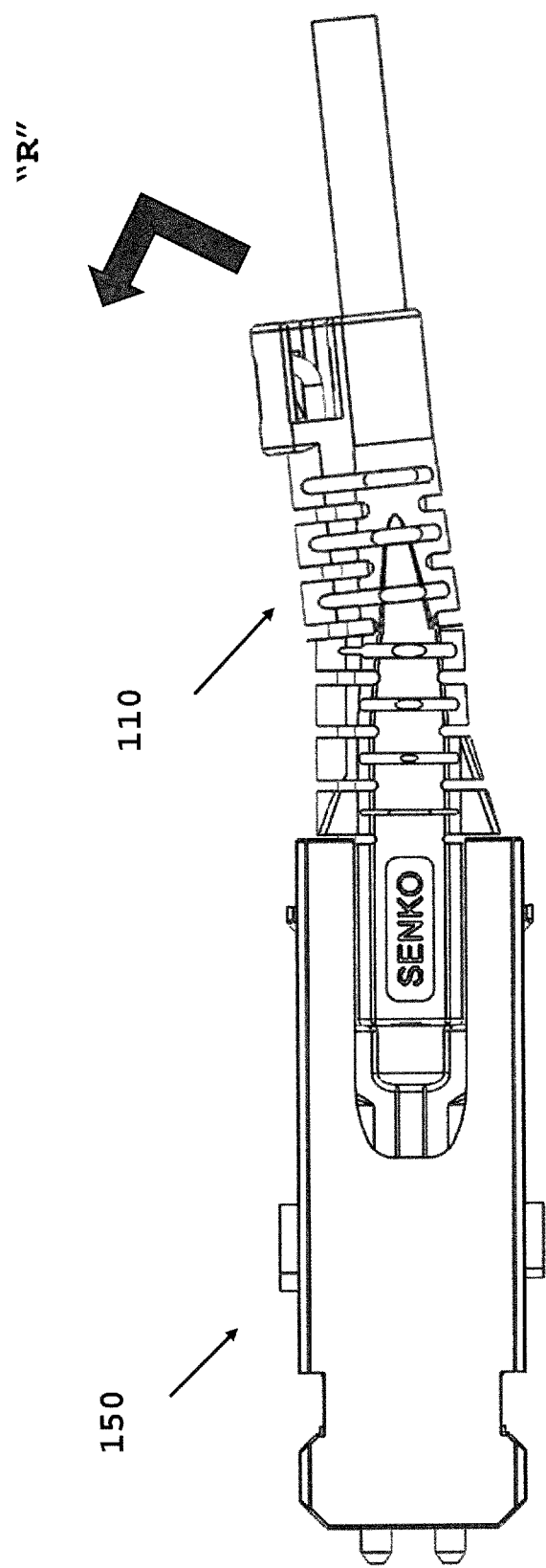
FIG. 13 is a perspective view of the flexible boot in a second position from a first position as depicted in FIG. 12.
Figure 14:
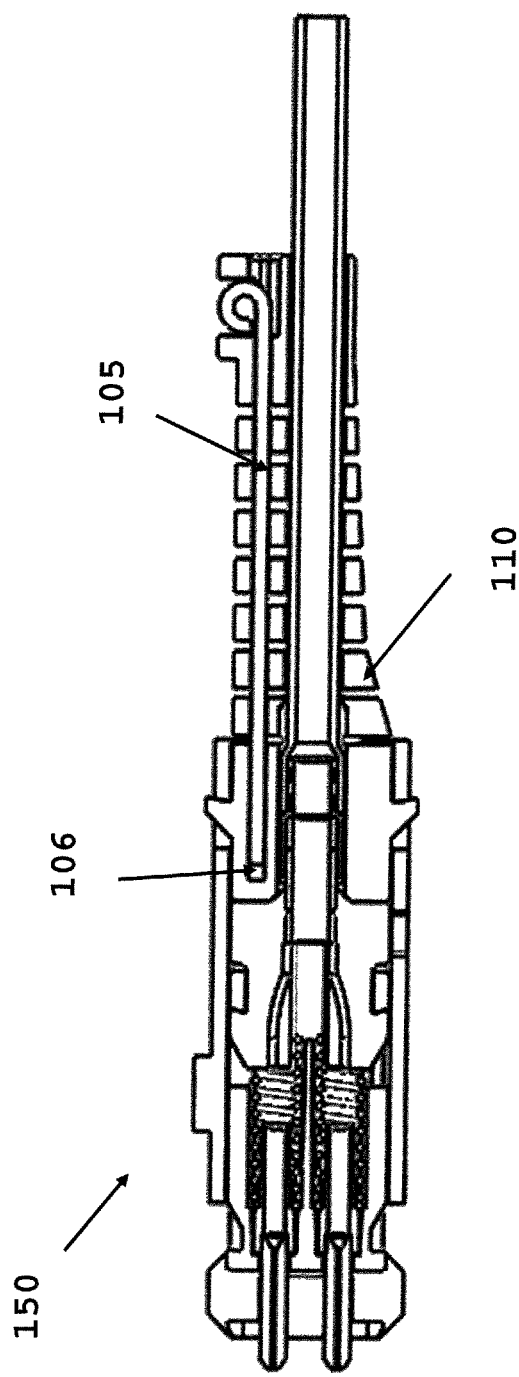
FIG. 14 is a cross section view along the longitudinal axis of the fiber optic connector with the flexible boot assembly installed thereon.

FIG. 11 depicts flexible boot assembly 200 prior to securing to a distal end of fiber optic connector 150. FIG. 12 depicts flexible boot assembly 200 partially inserted onto the distal end of fiber optic connector 150. FIG. 13 depicts flexible boot assembly 200 rotated up from first position in FIG. 14 to a second position. FIG. 14 depicts repositioning device 105 with in passageway 106 of boot 110.

The invention claimed is:

1. A flexible boot assembly comprising:
   a boot with a passageway therein;
   the passageway is sized to accept a repositioning device with an end configured to be secured within corresponding passageway of the boot;
   wherein bending the flexible boot assembly from a first position to a second position, the flexible boot assembly retains the second position without returning to the first position under the resilient material of the boot; and wherein
   a safety catch is formed at one end of the boot as part of the passageway.

2. The flexible boot assembly according to claim 1, wherein the safety catch locks the repositioning device within the passageway of the boot.

3. The flexible boot assembly according to claim 2, wherein the repositioning device further comprises a shaft with a bend at one end.

4. The flexible boot assembly according to claim 3, wherein the bend is secured behind the safety catch for retaining the repositioning device within the passageway.

5. The flexible boot assembly according to claim 4, wherein the bend is formed as a hook.

6. The flexible boot assembly according to claim 1, wherein the repositioning device extends along a longitudinal length of the boot.

7. The flexible boot assembly according to claim 1, wherein the passageway diameter is substantially equal to a diameter of the repositioning device for securing the repositioning device within the passageway under a contracting force.

8. A flexible boot assembly resulting in the configuration of claim 1.

9. A method of installing a flexible boot assembly onto a fiber optic connector housing comprising:
   providing the flexible boot assembly of claim 8;
   inserting a proximal end of the flexible boot assembly over a distal end of a fiber optic connector; and
   wherein bending the flexible boot assembly from a first position to a second position, the flexible boot assembly retains the second position without returning to the first position under the resilient material of the boot.

* * * * *